United States Patent Office 3,428,461
Patented Feb. 18, 1969

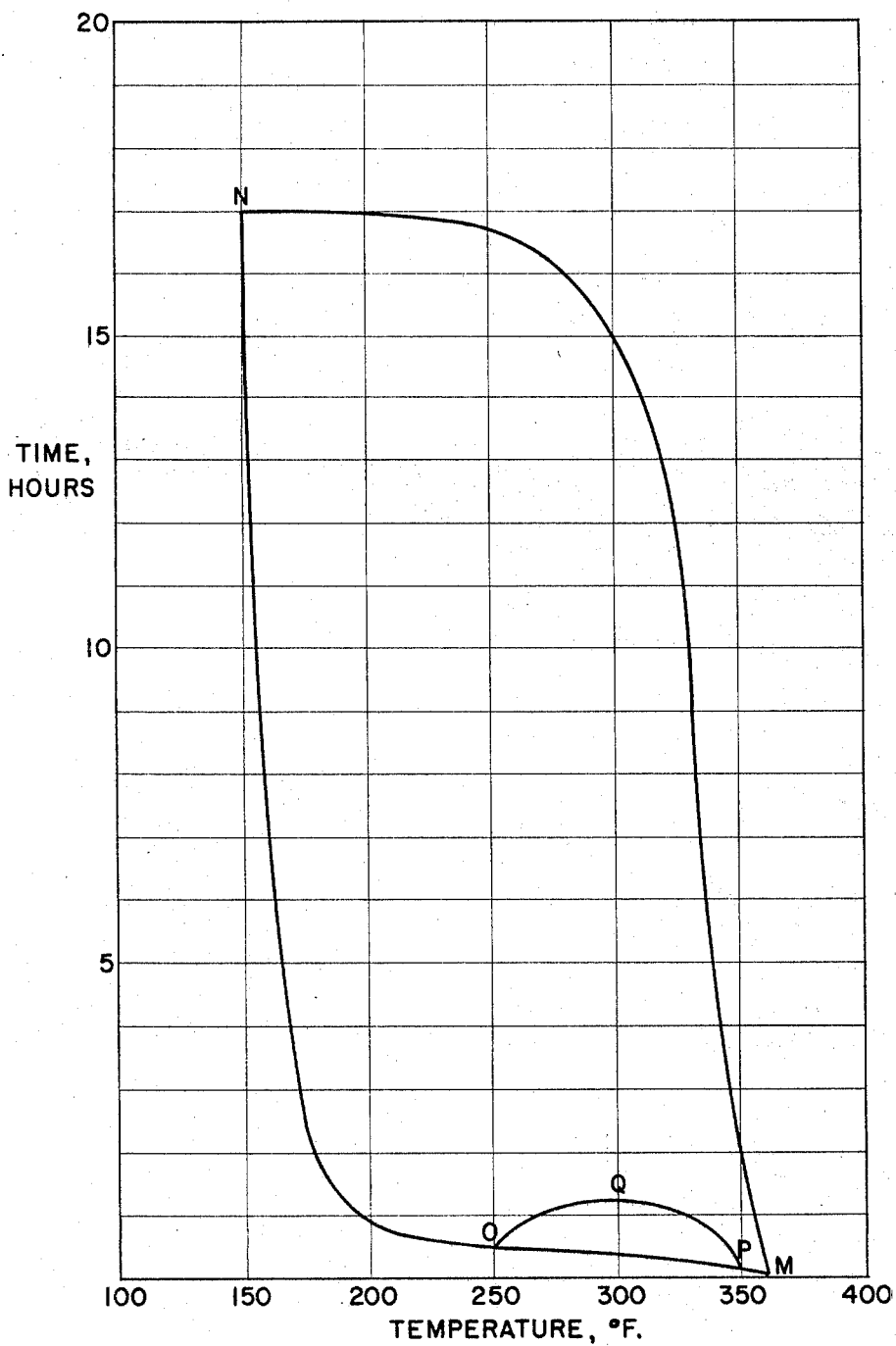
INVENTORS
William A. Hatton
Erlend R. Lowrey
ATTORNEYS

3,428,461
CULINARY MIXES
William A. Hatton and Erlend R. Lowrey, Greenhills, Ohio, assignors to The Procter & Gamble Company, Cincinnati, Ohio, a corporation of Ohio
Filed Sept. 29, 1965, Ser. No. 491,081
U.S. Cl. 99—94　　　　　　　　　　　　　　4 Claims
Int. Cl. A21d

ABSTRACT OF THE DISCLOSURE

A dry prepared culinary mix for layer cakes containing bread flour which has been dry heat treated under certain time and temperature conditions.

This invention relates to dry prepared culinary mixes containing sugar, flour which has been specially treated, and shortening from which baking batters can be prepared by the addition of liquid materials. More particularly, this invention involves the dry heat treatment of bread flour to make bread flour suitable for use in culinary mixes as a complete or partial replacement for conventional cake flour.

So-called "dry" prepared mixes used for baking are made by combining sugar, flour, shortening, and other ingredients including leavening, milk solids, egg solids, flavoring, and coloring, to form a free-flowing granular mixture. To prepare these dry mixes for baking, liquid materials such as water, milk, and eggs are added, and the combination is beaten to form a homogeneous mixture and to incorporate air. The resulting batter is then baked.

It is generally recognized that the only type of flour satisfactory for use in a culinary mix of the type described above, especially when layer cakes are to be prepared therefrom, is soft wheat flour. Indeed, so-called soft wheat flour is often characterized by referring to it as cake flour. Hard wheat flour, on the other hand, is most commonly used in the baking of bread which is why this type of flour is generally referred to as bread flour. Whether a flour is of the hard bread variety or of the soft cake variety depends, of course, upon the type of wheat from which the flour is obtained.

The primary chemical distinction between hard bread flour and soft cake flour lies in the respective protein content of these flours. As used herein: "bread" flour refers to hard wheat flour having a total protein content greater than 10% by weight; "cake" flour refers to soft wheat flour having a total protein content less than 10% by weight, as determined by the standard procedure of multiplying 5.7 times the Kjeldahl nitrogen content on a 14% moisture basis, according to Method 46–11 of Cereal Laboratory Methods, 7th edition, 1962, published by the American Association of Cereal Chemists.

It has long been deemed desirable to be able to use bread flour in prepared culinary mixes because of economic advantages and other advantages, e.g., there is an abundant supply of bread flour. Heretofore, attempts to use bread flour as the primary farinaceous component of a culinary mix failed because products such as layer cakes which were prepared with hard wheat flour were not satisfactory. In fact, it has generally been deemed impossible to prepare a product such as a layer cake from a culinary mix based upon bread flour rather than conventional cake flour.

Accordingly, it is an object of this invention to provide a method of treating bread flour whereby the flour is rendered suitable for use in prepared culinary mixes.

It is another object of this invention to provide dry, prepared culinary mixes which are based upon bread flour and yet have substantially the same desirable characteristics as culinary mixes based upon cake flour.

It is a further object of this invention to provide culinary mixes containing specially treated bread flour from which delectable and desirable layer cakes can be prepared.

In general, this invention comprises a dry prepared culinary mix containing sugar, flour, and shortening, the flour being bread flour which has been dry heat treated at a temperature ranging from about 150° F. to about 360° F. for a period of time ranging from about 1 minute to about 17 hours. Preferred conditions for the dry heat treatment is a temperature ranging from about 250° F. to about 350° F. for a period of time ranging from about 10 minutes to about 80 minutes. The accompanying drawing is a diagram showing in more detail these time-temperature relationships as is more fully discussed hereinafter.

"Dry heat treatment," as used herein, means heating only in the presence of any moisture which may be inherently present in the flour but not in the presence of any additional or added moisture or in the presence of a humid atmosphere, i.e., greater than about 40% relative humidity.

The dry heat treatment of bread flour of this invention requires a temperature ranging from about 150° F. to about 360° F. The time required for the heating is not a rigidly fixed value and is primarily determined by the level of temperature employed. However, it can be generally stated that higher heat-treatment temperatures require less time than do lower temperatures. Thus, the treatment time will vary depending upon the temperature employed. It will also vary slightly with the method of heating.

The most rigorous treatment condition, and that which determines the higher time-temperature limit, is a combination of time and temperature at which the flour begins to scorch or burn. The lower time-temperature limitation is determined by the conditions which fail to bring about the required physicochemical change in the bread flour which renders it suitable for use in the prepared culinary mixes of this invention. A temperature of at least 150° F. has been found to be necessary to cause this desired physicochemical change, irrespective of heating time or other considerations and therefore this is an absolute temperature limitation.

Even though exact time-temperature relationships for the heat treatment process cannot be precisely stated, dry heat treating at any of the time and temperature combinations within the area MNOPM on the diagram of the drawing are satisfactory for the purposes of the present invention in that dry heat treating bread flour under these conditions will bring about the required physicochemical change in the flour without causing undesirable scorching or burning. Particularly advantageous results are realized when the bread flour is dry heat treated at any combination of time and temperature within the area PQOP on the diagram of the drawing; combinations of time and temperature within area PQOP therefore represent preferred embodiments of this invention.

The physicochemical change which occurs in bread flour when it is subjected to the specific dry heat treatment conditions of this invention and which is necessary to render the bread flour suitable for use in the culinary mixes of this invention is not well understood. Although applicants do not wish to be bound by any particular theory, it is believed that dry heat treatment of bread flour at the particular conditions disclosed herein loosens the flour lipids which are normally tightly bound to the starch granule thus increasing the water-soluble nitrogen content of the flour and this in turn affects the degree of water solubility of certain proteins contained in the flour although it does not alter the total protein content of the flour. In any event, this treatment renders bread flour suitable for use in dry, prepared culinary mixes from which products such as layer cakes can be made. This result is surprising and unexpected because neither the use of bread flour per se, nor most previously known modified bread flours would permit the preparation of delectable and satisfactory layer cakes.

Heat treatment of flour, for purposes distinct from those herein contemplated, has been previously performed and examples of process equipment useful for such treatment can be found in U.S. Patent 1,636,569 granted to Kent-Jones et al. on July 19, 1927 and in U.S. Patents 1,710,472 and 1,710,503 granted to Chitty et al. on Apr. 23, 1929. The heat treatment of bread flour for the purposes of the instant invention can be carried out by using the equipment described in any of the aforesaid U.S. Patents or by any other convenient manner. For instance, the flour to be treated is placed on open trays and heated in a conventional oven, or it is heated under vacuum in a conical blender. Screw conveyors with appropriate heat transfer media, fluidized beds or the like also represent satisfactory equipment with which the heat treatment can be effected.

Methods for dry heat treating bread flour, suitable for the practice of this invention, are illustrated in Examples I, II, and III below. These examples also represent specific embodiments of this invention in regard to the time-temperature conditions which are required to produce heat treated bread flour suitable for use in prepared culinary mixes. Layer cakes prepared from dry mixes containing heat treated bread flour are hereinafter illustrated in Examples IV to XX.

EXAMPLE I 2000 grams of a commercially available bread flour obtained from the International Milling Company under the tradename "Royal Dragon," having a total protein content of 11.5% by weight, was placed on a stainless steel tray measuring 20 inches by 30 inches by 1 inch deep. The flour was leveled to a uniform depth of ½ inch. The tray was then placed in a standary laboratory convection oven which was set at a constant temperature of 180° F. The oven was vented whereby the interior was exposed to atmospheric pressure. After 12 hours, the tray was removed from the oven and the flour was allowed to cool to room temperature. The flour was then ready for use in a prepared culinary mix.

EXAMPLE II 2000 grams of a commercially available bread flour obtained from the International Milling Company under the trade name "Mel-O-Pro," having a total protein content of 10.1% by weight, was placed on a stainless steel tray measuring 20 inches by 30 inches by 1 inch deep. The flour was leveled to a uniform depth of ½ inch. The tray was then placed in a standard laboratory convection oven which was set at a constant temperature of 220° F. After 16 hours the tray was removed from the oven and the flour was allowed to cool at room temperature. The flour was then ready for use in a prepared culinary mix.

EXAMPLE III 20 pounds of a commercially available bread flour obtained from the International Milling Company under the trade name "Royal Dragon," having a total protein content of 11.5% by weight, was placed in a jacketed conical blender. The jacket was filled with high pressure steam to heat the flour and the blender was rotated at 40 r.p.m. A thermocouple was inserted into the flour to measure its temperature and the steam rate was controlled to maintain the flour temperature of 210° F. During this process, the pressure in the blender was maintained at 15 pounds per square inch gauge. After 1 hour the flour was removed from the blender and the flour was allowed to cool at room temperature. The flour was then ready for use in a prepared culinary mix.

In this example, the pressure in the blender can be increased, e.g., to 20 p.s.i.g., or it can be decreased e.g., to −20 p.s.i.g. with equally satisfactory results.

Prepared culinary mixes suitable for the practice of this invention must contain sugar and shortening as well as the specially treated bread flour. Additional ingredients such as milk solids, hydrophilic colloids, leavening and flavoring are added to provide the specific type of product desired.

The flour can be any bread flour which has been treated in the manner described herein. Examples of bread flour are hard red spring flour, hard red winter flour, durham flour, and the like. Hard red spring and hard red winter are the wheat flours preferably used as the bread flour ingredient in the mixes of this invention. Particular bread flours that are of this type (hard red spring and hard red winter) and which in addition have a total protein content ranging from 10% to about 24% by weight are especially preferred, most preferably, from 16% to 22% by weight.

Suitable sugars include any of the commonly used granular sugars such as sucrose, dextrose, maltose, fructose, lactose and brown and invert sugars. The sugar can also be in powder form and mixtures of more than one type of sugar can be used.

The ratio of sugar to flour can be adjusted as necessary for special circumstances but a ratio of sugar to flour in excess of 1:1 has long been known to result in particularly good cake mixes which are often referred to as "high-ratio" cakes. Cakes in which the ratio of sugar to flour is less than 1:1 are generally referred to as "low-ratio" cakes.

The shortenings which can be employed in the culinary mix systems of this invention include solid or plastic as well as liquid or semi-fluid glyceride shortening derived from animal, vegetable or marine fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidenoyl, hehenoyl, erucoyl and the like and are generally obtained from edible oils and fats such as cottonseed oils, soybean oil, coconut oil, rapeseed oil, peanut oil, olive oil, palm oil, palm kernel oils, sunflower seed oil, wallflower oil, pilchard oil, lard, tallow and the like. These glycerides can also contain in part one or two short-chain acyl groups having from 2 to about 6 carbon atoms such as acetyl, propanoyl, butanoyl, valeryl, and capropyl; they can be prepared by random or low-temperature interesterification reactions of fatty triglyceride-containing oils and fats such as interesterified or rearranged cottonseed oil and lard; and they can be otherwise formed by various organic syntheses.

Preferably, the shortening should be of the so-called emulsified variety, containing up to 50%, and more normally about 5–25%, by weight of one or more suitable emulsifiers. The partially esterified polyhydric compounds having surface active properties are an example of appropriate emulsifiers. This class of emulsifiers includes, among others, mono- and di-glycerides of fatty acid esters of glycols, such as propylene glycol monostearate and monobehenate; higher fatty acid esters of sugars, such as the partial palmitic and oleic esters, such as dodecyl glyceryl ether sulfate and monostearin phosphate. Other examples are the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

Preferably, the emulsifier is any one or a combination of the various alpha phase crystal tending emulsifiers disclosed in U.S. Patents 3,145,108 and 3,145,109 issued to Howard on Aug. 18, 1964 and in U.S. Patent 3,145,110 issued to Abbott on Aug. 18, 1964. Examples of such alpha phase crystal tending emulsifiers are propylene glycol monostearate, acetylated mono- or di-glycerides, and lactylated mono- or di-glycerides.

Another ingredient which is preferably used in conjunction with the shortening of these mixes is a high temperature batter stabilizer such as stearic acid, malic stearate, and octadecyl hydrogen succinate or any of the high temperature batter stabilizers which are disclosed in U.S. Patents 3,145,108, 3,145,109, 3,145,110 and are also disclosed in U.S. Patent 3,168,405 issued to Howard and Martin on Feb. 5, 1965. The high temperature batter stabilizer is preferably used in an amount of from about 0.25 to about 4.0% by weight of the shortening.

An additional ingredient which is advantageously used in conjunction with the shortening in these mixes is a polyvalent metal ion salt such as calcium chloride or magnesium sulfate or any of such salts disclosed in the copending application of Strobel, Ser. No. 321,436, filed Nov. 5, 1963, now U.S. Patent No. 3,268,338. The polyvalent metal ion salt is preferably used in an amount of from about 0.0001% to about 1.0% by weight of the shortening.

The selection of a chemical leavening system from among those known in the art poses no problem for one skilled in the formulation of culinary mixes. In general such systems are composed of baking soda, e.g., sodium, potassium, or ammonium bicarbonate, on the one hand, and one or more phosphates or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6 to 10. Frequently, provision of a slight excess of soda is advantageous so as to assure absence of unreacted acid/or to compensate for the acid tendency of some batter ingredients.

For many mixes it is accepted practice for the housewife to add the required amount of eggs in the course of batter preparation and this practice can be followed just as well in the present mixes. If desired, the inclusion of egg solids in the mix is an allowable alternative. The function and permissible variations in the remaining ingredients, for example, flavor, color, dry milk solids, or the like, are sufficiently apparent to render the detailed explanation thereof unnecessary.

It is to be understood that a wide variety of cakes can be prepared from mixes which contain the above named ingredients, but, for purpose of illustration, a specific application of this invention to layer cake mixes will be set forth in detail. The composition of the mixes of this invention which are suitable for baking layer cakes can vary but representative compositions are within the following ranges.

| Ingredients: | Percent by wt. of dry mix |
|---|---|
| Dry heat treated bread flour | 20–50 |
| Sugar | 20–70 |
| Shortening | 4–26 |
| Leavening agents | 0–4 |
| Egg solids | 0–5 |
| Hydrophillic colloids | 0–1 |
| Non-fat dried milk solids | 0–5 |
| Cocoa | 0–10 |
| Flavoring (including spices) | 0–10 |
| Coloring | Minor amounts |

The exact method of compounding the dry mixes of this invention is not critical. Very satisfactory results are obtained by blending the heat treated flour, sugar, and shortening into a homogeneous premix in a ribbon blender. This premix can be passed through an impact grinder to eliminate any lumps which may be formed. Additional ingredients can then be added and the whole mixture of ingredients again mixed. An additional step of impact grinding may be desirable to remove any lumps present in the final dry mix.

Another method of preparing the dry mix is by the method disclosed in U.S. Patents 2,874,051 issued to Bedenk et al., 2,874,052 issued to Bedenk, and in 2,874,053 issued to Mills on Feb. 17, 1959 in which a homogeneous blend is formed containing sugar, flour and shortening, ad this blend is then subjected to simultaneous shearing and crushing forces.

All types of flour-based prepared layer cake mixes and layer cake batters can be made with the products of this invention. While cakes, yellow cakes, chocolate cakes, devils food cakes, marble cakes, spice cakes, high ratio as well as low ratio cakes, and many other layer cakes of excellent quality can be prepared simply by mixing the layer cake ingredients together with water in a single mixing step, or multiple mixing steps, followed by baking.

One of the primary benefits observed with culinary mixes containing bread flour which has been heat treated by the methods described herein and illustrated in Examples I to III is that layer cakes have a normal and desirable structure. Cakes prepared from mixes containing bread flour per se, i.e., non-heat treated bread flour, are soggy, dipped, and often completely void of normal cake structure. This is illustrated in the following examples.

EXAMPLE IV

Devils food cakes

Six dry layer cake mixes (A, B, C, A', B', C') were prepared by thoroughly blending together sugar, flour, and shortening along with the other ingredients shown below in a conventional heavy duty mixer, and then subjecting this blend to impact grinding to break up the agglomerates or large particles which were present.

Dry mix-basic composition

| Ingredients: | Percent by weight of dry mix |
|---|---|
| Bread flour | 33.49 |
| Sugar (industrial fine granulated sucrose and dextrose) | 44.19 |
| Shortening (a mixture of tallow and directly rearranged lard hydrogenated to an iodine value of about 55) | 11.00 |
| Cocoa | 6.00 |
| Soda | 1.80 |
| Leavening acid | 0.37 |
| Salt | 1.00 |
| Non-fat dry milk solids | 1.40 |
| Flavor, minors | 0.75 |

Each of the six cakes was identical except for the flour ingredient. Cakes A, B and C respectively contained the heat treated bread flours of Examples I, II and III. Control cakes A', B' and C' respectively contained the same bread flours of Examples I, II, and III except for flours used in these cakes were not heat treated, i.e., the flours were used in the same form in which they were commercially obtained.

Batter was made by adding 320 grams of water to 540 grams of each mix. Two eggs were then added and the batter was mixed for two minutes on a home style electric mixer at medium speed. Eight inch round pans were then respectively filled with 472 grams of each batter. Cakes were baked at 350° F. for approximately 32 minutes. The cakes were removed from the oven, allowed to cool for 10 minutes, depanned, and allowed to cool for an additional 20 minutes. The following measurements and observations were made on each cake and recorded in Table I below.

TABLE I.—EFFECT OF HEAT TREATED BREAD FLOUR IN A DEVILS FOOD CAKE

| | CAKE A (heat treated bread flour of Example I) | CAKE A' (non-heat treated bread flour of Example I) | CAKE B (heat treated bread flour of Example II) | CAKE B' (non-heat treated bread flour of Example II) | CAKE C (heat treated bread flour of Example III) | CAKE C' (non-heat treated bread flour of Example III) |
| --- | --- | --- | --- | --- | --- | --- |
| Hot Cake Height (inches):[1] | | | | | | |
| Center | 2.01 | 1.89 | 2.10 | 2.00 | 1.95 | 1.80. |
| Edge | 1.56 | 1.70 | 1.82 | 1.72 | 1.60 | 1.40. |
| Cold Stacked Height (inches).[2] | 3.10 | 1.50 | 3.80 | 2.05 | 3.40 | 1.50. |
| Eating Quality | Normal | Dough like | Normal | Very gummy | Normal | Dough like. |
| Appearance | Normal layer cake. | Collapsed, not a layer cake structure. | Normal layer cake. | Collapsed, not a layer cake structure. | Normal layer cake. | Collapsed, not a layer cake structure. |

[1] The hot cake height was measured 30 seconds after the cakes were removed from the oven. The center height is the highest point on the cake, the edge height is the highest point on the cake at ½ inch in from the edge of the cake.

[2] The cold stacked height was measured 1 hour after the cakes were removed from the oven; it is the height at the center of the cake when one layer is cut in half and the two halves are stacked bottom to bottom on top of each other.

It can be observed from Table I that layer cakes prepared from culinary mixes containing bread flour which has been heat treated in accordance with this invention are very satisfactory, especially in regard to structure and eating quality. This contrasts to layer cakes prepared from culinary mixes containing the identical but non-treated bread flour which are not satisfactory. For instance, Cake A containing bread flour which had been dry heat treated at 180° F. for 12 hours exhibited a normal eating quality and layer cake structure. The normal structure is illustrated by the 3.10 inch cold stacked height measurement compared to the 2.01 inch and 1.56 inch center and edge height measurements, i.e., cake A was "domed" in the center; this is desirable and normal for a layer cake. However, cake A' containing the same basic (but non-treated) bread flour as cake A exhibited a "dough like" eating quality and had an undesirable (collapsed) structure. The collapsed structure of this cake is illustrated by the 1.50 inch cold stacked height measurement compared to the 1.89 inch and 1.70 inch center and edge height measurements, i.e., cake A' was not "domed" in the center but was "dipped"; it was therefore not a normal layer cake.

EXAMPLES V–XII

In the following examples, eight culinary mixes suitable for the preparation of yellow-type cakes, are prepared containing the following basic ingredients.

Yellow cake

Ingredients: Percent by wt. of dry mix

Flour (bread flour,[1] heat treated as shown in Table II) _____ 39.0
Sugar (industrial fine granulated sucrose) ____ 45.5
Shortening (refined and bleached cottonseed oil containing 14% propylene glycol monostearate and 2% stearic acid) _____ 11.7
Dry milk solids _____ 0.2
Salt _____ 0.5
Soda _____ 1.3
Acid leavening _____ 0.3
Carboxymethyl cellulose _____ 0.3
Flavor _____ 1.2

[1] The flour has a protein content of 12% by weight.

These mixes and layer cakes baked therefrom are prepared in the same manner as the mixes and cakes of Example IV. The bread flour used in each of these mixes is heat treated in a standard convection oven at a time-temperature condition shown in Table II.

TABLE II.—HEAT TREATMENT OF BREAD FLOUR USED IN A YELLOW-TYPE LAYER CAKE

| Example | Time, minutes | Temperature, ° F. |
| --- | --- | --- |
| V | 10 | 350 |
| VI | 20 | 340 |
| VII | 60 | 320 |
| VIII | 80 | 300 |
| IX | 70 | 280 |
| X | 50 | 270 |
| XI | 40 | 260 |
| XII | 30 | 250 |

All of the cakes of Examples IV–XII exhibit normal cake structure and have a delectable eating quality.

EXAMPLES XIII–XX

In the following examples, eight culinary mixes suitable for the preparation of white-type layer cakes, are prepared containing the following ingredients:

White cake

Ingredients: Percent by wt. of dry mix

Flour (bread flour,[1] heat treated as shown in Table III) _____ 39.8
Sugar (industrial fine granulated sucrose and dextrose) _____ 45.4
Shortening (a mixture of tallow and directly rearranged lard hydrogenated to an iodine value of about 55, containing 8% glyceryl lacto stearate, 2% octadecyl hydrogen succinate, and 0.001% calcium chloride) _____ 9.5
Non-fat dried milk solids _____ 2.0
Salt _____ 0.7
Soda _____ 1.0
Acid leavening _____ 1.2
Vanilla _____ 0.4

[1] The flour has a protein content of 18% by weight.

The bread flour used in each of these mixes is heat treated in a screw conveyor heat exchanger at a time-temperature condition shown in Table III.

Batter is prepared from 540 grams of each mix by adding thereto 320 grams of water and the whites of two eggs. After mixing on a home style electric mixer for two minutes, cakes are baked at 400° F. for 25–30 minutes.

TABLE III.—HEAT TREATMENT OF BREAD FLOUR USED IN A WHITE-TYPE LAYER CAKE

| Example | Time, hours | Temperature, ° F. |
| --- | --- | --- |
| XIII | 1 | 310 |
| XIV | 3 | 250 |
| XV | 5 | 200 |
| XVI | 7 | 180 |
| XVII | 10 | 170 |
| XVIII | 12 | 160 |
| XIX | 15 | 155 |
| XX | 16 | 150 |

All of the cakes of Examples XIII–XX exhibit normal cake structure and have a delectable eating quality.

While the invention has been described primarily in its application to dry prepared mixes for layer cakes, variations and modifications thereof can be made without departing from the spirit and scope of the invention. For instance, the concept of the invention can well be applied to culinary mixes other than layer cake mixes in which cake flour is ordinarily the primary farinaceous ingredient. It is also possible to substitute heat treated bread flour for a portion of the cake flour used in dry prepared culinary mixes to obtain a portion of the benefits described herein.

What is claimed is:

1. A dry prepared culinary mix for the preparation of layer cakes, said mix comprising by weight:
   (A) 20%–50% bread flour which has been dry heat treated at a temperature ranging from about 150° F. to about 360° F. for a period of time ranging from about 1 minute to about 17 hours;
   (B) 20%–70% sugar; and
   (C) 4%–26% shortening.

2. The dry prepared culinary mix of claim 1 wherein the bread flour is obtained from hard red winter wheat.

3. The dry prepared culinary mix of claim 1 wherein the bread flour has a total protein content ranging from 10% to about 24% by weight.

4. The dry prepared culinary mix of claim 1 wherein the bread flour has a total protein content ranging from 16% to about 22% by weight.

References Cited

UNITED STATES PATENTS

| | | | |
|---|---|---|---|
| 1,136,501 | 4/1915 | Andrews | 99—93 XR |
| 1,636,569 | 7/1927 | Kent-Jones et al. | 99—93 |
| 1,710,472 | 4/1929 | Chitty et al. | 99—93 |
| 1,710,503 | 4/1929 | Kent-Jones et al. | 99—93 XR |
| 2,555,902 | 6/1951 | Salo et al. | 99—94 |
| 3,144,338 | 8/1964 | Burke et al. | 99—90 |

RAYMOND N. JONES, *Primary Examiner.*

U.S. Cl. X.R.

99—93